March 17, 1964  H. P. SLEEPER, JR  3,125,091
INFLATABLE SOLAR ENERGY COLLECTOR
Filed Sept. 17, 1962  4 Sheets-Sheet 1

INVENTOR.
HARVEY P. SLEEPER, JR.
BY Knox & Knox

March 17, 1964  H. P. SLEEPER, JR  3,125,091
INFLATABLE SOLAR ENERGY COLLECTOR
Filed Sept. 17, 1962  4 Sheets-Sheet 2

INVENTOR.
HARVEY P. SLEEPER, JR.
BY
Knox & Knox

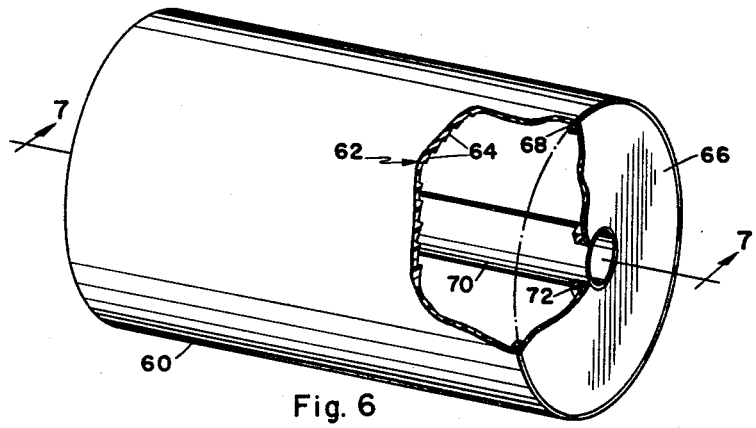
Fig. 6
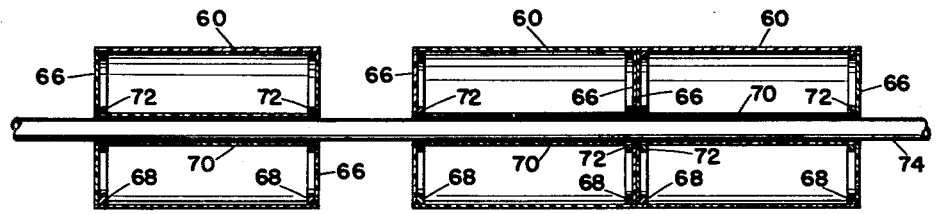
Fig. 7
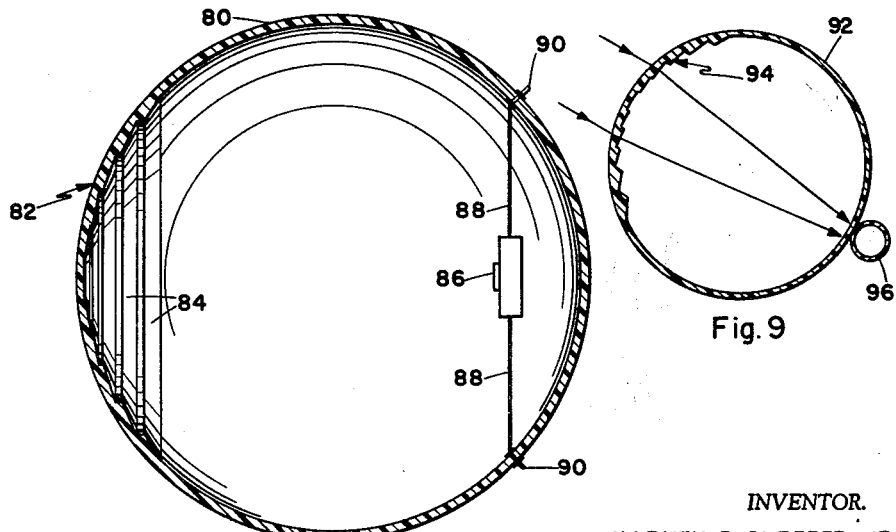
Fig. 8
Fig. 9
INVENTOR.
HARVEY P. SLEEPER, JR.
BY Knox & Knox

INVENTOR.
HARVEY P. SLEEPER, JR.

ATTORNEYS

United States Patent Office 3,125,091
Patented Mar. 17, 1964

3,125,091
INFLATABLE SOLAR ENERGY COLLECTOR
Harvey P. Sleeper, Jr., 516 Nardo Ave.,
Solana Beach, Calif.
Filed Sept. 17, 1962, Ser. No. 224,892
17 Claims. (Cl. 126—271)

The present invention relates generally to solar energy collectors and more particularly to an inflatable solar energy collector and is a continuation-in-part of my copending application, Serial No. 811,950, filed May 8, 1959.

The primary object of this invention is to provide a solar energy collector which is inflatable and has an integral zoned portion or integral zoned portions designed to focus solar energy on a predetermined restricted area. Such zoned portion may be in the form of a lens and/or in the form of a mirror.

Another object of this invention is to provide a solar energy collector in which the zoned portion is formed on the inner surface of the unit and is thus protected against wear or damage.

Another object of this invention is to provide a solar energy collector which may be made in cylindrical or spherical form, the cylindrical form being adaptable for use as a solar still which may be assembled in any size by adding inflatable units. As a further advantage, the inflated units can be floated on the water which is being distilled.

Still another object of this invention is to provide a solar energy collector in which pipes or other energy receiving components can be incorporated into the structure of the unit.

A further object of this invention is to provide a solar energy collector which may have integral reflector portions to increase the concentration of solar rays.

Finally, it is an object to provide an inflatable solar energy collector of the aforementioned character which is simple and convenient to make and use and which will give generally efficient and durable service.

With these and other objects definitely in view, this invention comprises the novel construction, combination and arrangement of elements and portions, as will be hereinafter fully described in the specification, particularly pointed out in the claims, and illustrated in the drawings which form a part of this disclosure, and in which:

FIG. 6 is a perspective view, partially cut away, of an individual cell type of cylindrical collector;

FIG. 7 is a reduced sectional view taken on the line 7—7 of FIG. 6 and shown in multiple to illustrate the assembly of several units on a pipe;

FIG. 8 is a diametrical sectional view of a spherical collector with an electrical type energy receiver;

FIG. 9 is a sectional view similar to FIG. 1, on a reduced scale, showing an external heated element;

Figure 1:
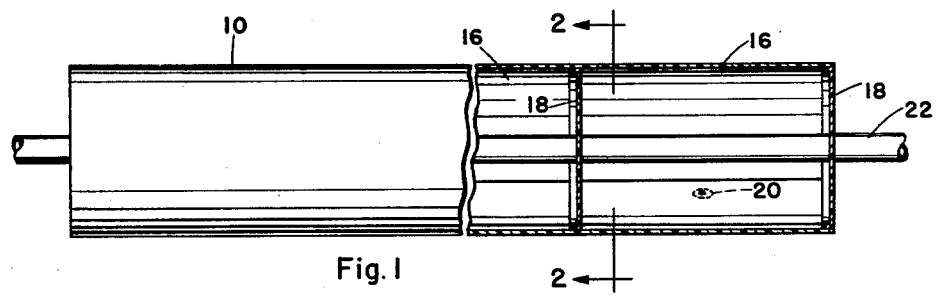
FIG. 1 is a side elevation view, partially sectioned, of a cylindrical form of collector.
Figure 2:
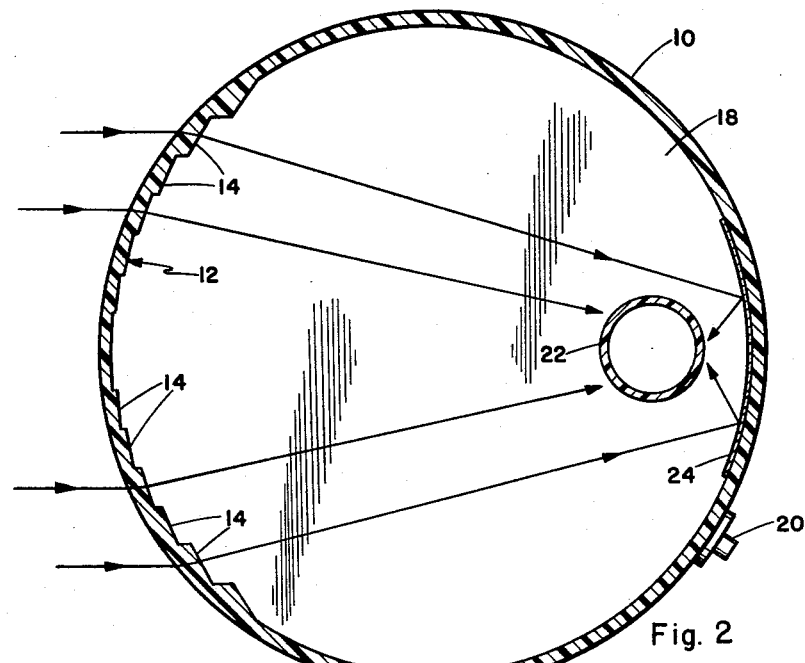
FIG. 2 is an enlarged sectional view taken on the line 2—2 of FIG. 1.
Figure 3:
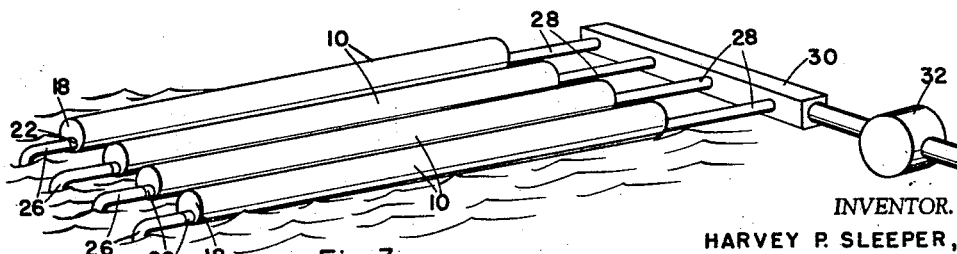
FIG. 3 is a diagrammatic perspective view of several cylindrical units connected in a floating assembly.

Referring now to FIGS 1–3 of the drawings, the collector comprises a cylindrical casing 10 of flexible, substantially transparent material such as plastic sheet, several types of which are suitable for the purpose. The casing is provided with a solar energy focusing portion in the form of a lens portion 12 of the zone lens or fresnel type and comprising a plurality of parallel, longitudinally extending zones 14, the zones aggregatively corresponding to a generally convex lens surface. The lens zones 14 extend linearly of the casing 10, which may be of any practical length. For simplicity of manufacture, the casing may be extruded in tubular form through a die shaped to conform to the lens geometry, or may be extruded or rolled as a sheet which is then rolled and edge-bonded into a cylinder. Regardless of the method of manufacture, the casing 10 is divided into a plurality of compartments 16 separated by circular transverse walls 18, which are bonded or heat sealed to the casing so that each compartment is independently inflatable. Thus in the event of rupture, only one compartment 16 will be affected. Inflation is accomplished through simple valves 20 of conventional construction attached to each compartment 16 and, since the pressures involved are very low, the valves may be molded from plastic for simplicity and ease of attachment to the casing.

In the particular form shown in FIGS. 1–3, the collector is used to heat a water pipe 22 eccentrically mounted in the casing 10 and extending longitudinally thereof, said pipe being supported by and sealed to the walls 18. Since the temperature of the pipe 22 will be little higher than that of boiling water, a heat resistant plastic may be used for the pipe, making the entire structure collapsible for storage. The lens 12 is designed to focus the solar rays at a point beyond the pipe 22 and, to increase efficiency, a reflector strip 24 is applied to the casing 10 diametrically opposite said lens. The reflector strip 24 may be applied as metallic paint or by a vacuum deposition process. With this arrangement, part of the focussed solar energy strikes the front of the pipe 22 directly from the lens 12, while the remainder is reflected from the strip 24 to the back of the pipe. With the longitudinal form of lens, the solar rays are, of course, brought to a linear focus rather than a single point, so that a pipe extending the full length of the structure is practical. The entire pipe 22 is heated in this manner and may be blackened if desired for more effective heat absorption.

One particularly useful way of using this type of collector is in a sea water conversion plant, which is shown diagrammatically in FIG. 3. A plurality of casings 10 are arranged in parallel relationship, each having an inlet portion 26 and an outlet portion 28 connected to its pipe 22. The outlet portions 28 are coupled to a suitable manifold 30 which is attached to a pump 32 to draw water through the pipes. The arrangement may vary considerably according to equipment and requirements. The entire assembly is floated on the water and turned to extend in a generally East-West direction, each casing 10 being oriented so that the optical axis of the lens 12 is directed at the sun. Thus the solar energy is properly focussed on the pipes 22 during the apparent passage of the sun across the sky. Over an extended period of use, the only adjustment necessary is occasional re-orientation of the casings 10 to align with the changing elevation of the sun above the horizon.

Figure 4:
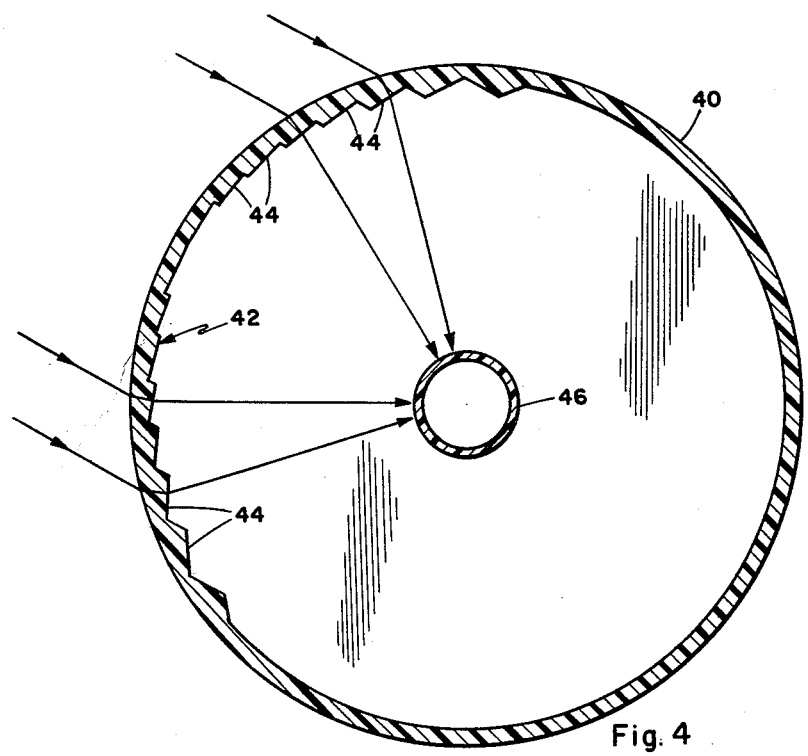
FIG. 4 is a sectional view similar to FIG. 2, but showing an alternative positioning of the heating element.

A slightly modified form of the collector is illustrated in FIG. 4. The general construction is similar to that described above and includes a casing 40 having a lens 42 with zones 44, but the pipe 46 is axially located in the casing and the focal length of said lens is shortened to focus the solar rays directly on the pipe, no reflector being used in this instance. While the efficiency is reduced slightly, the structure is simpler and may be more desirable for certain applications.

Figure 5:
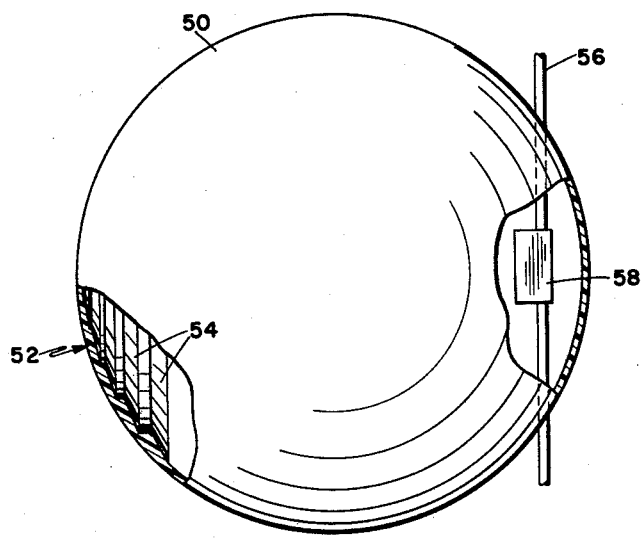
FIG. 5 is a side elevation view, partially cut away, of a spherical form of collector.

FIG. 5 shows a collector having a spherical casing 50 in which the lens 52 comprises a plurality of concentric annular zones 54. A pipe 56 is mounted across the casing 50 at the focus of the lens 52, said pipe being of small diameter and having an enlarged boiler portion 58 at the center thereof to receive maximum solar energy with minimum heat loss in the pipe. This particular form is useful for relatively low yield applications and may be ideally suitable for use in ocean survival kits to provide fresh water.

The collector shown in FIGS. 6 and 7 is similar in construction to that of FIG. 4, but is made as a single chambered complete unit. This form comprises a cylindrical casing 60 having a lens 62 with longitudinal zones 64, the ends of said casing being enclosed by circular walls 66, the peripheral joints of which are reinforced by small outer rings 68. A tubular sleeve 70, sealed to the walls 66 by inner rings 72, extends axially through the casing 60. The entire structure is flexible and collapsible for storage, only inflation being necessary to erect the unit for use. FIG. 7 illustrates the manner in which several units are assembled by threading a pipe 74 through the sleeves 70, so that any desired length of pipe may be heated. The casings 60 may be taped or otherwise secured together if necessary to maintain alignment.

All the forms thus far described may be used for various purposes such as water heating, water distillation, steam generation for heat or power, or heating anything which can be passed through the pipes. However, since the device is essentially a solar energy collector, its use is not limited to heating of fluids. For instance, either the spherical or cylindrical forms may be adapted for use as a solar furnace to produce extremely high temperatures.

A further adaptation is illustrated in FIG. 8 in which a spherical casing 80 having a lens 82 with concentric ring zones 84 is fitted with a thermoelectric element 86. The element 86 is suitably supported as by wires 88 extending from suitable terminals 90 fixed in the casing 80, said wires being flexible to facilitate collapse of the unit, but being of the proper length to hold said element erected at the focus when the casing is inflated. The thermoelectric element 86 is of the type which generates electricity directly from heat or solar energy, various suitable elements being available.

The last described unit may be used to supply electrical power for satellites or space vehicles which require continuous, long term power supplies of fairly low potential. In this respect, the casing 80 is light in weight, easily packed into a minimum of space and can be inflated by a very small quantity of inert gas, sufficient only to hold the casing extended under conditions of high vacuum. In such a condition heat losses by conduction or convection are minimized and the overall efficiency is increased.

The form illustrated in FIG. 9 is similar to the basic structure of FIG. 1 and includes a cylindrical casing 92 having a lens 94. The pipe 96, however, is fixed to the outside of the casing 92 diametrically opposite the lens 94, the focal length of said lens being such that the solar energy is concentrated along the pipe. This particular form may be more economical to manufacture since the pipe may be added to the completed casing, rather than built in and supported by transverse walls.

Referring now to the embodiment shown in FIG. 10, here again the inflatable casing 98 may be cylindrical or spherical, but is shown as being cylindrical. The element to be heated is shown in the form of a pipe 100. In the embodiment illustrated, one-half of the casing 102 is transparent and does not function as a lens, while the other half 104 is in the form of a fresnel mirror, i.e., the inner surface 106 is coated with a light reflecting material to form a mirror, and the reflected rays are focussed, by fresnel sections 107, i.e., concentrated onto the element 100 to be heated.

Figure 10:
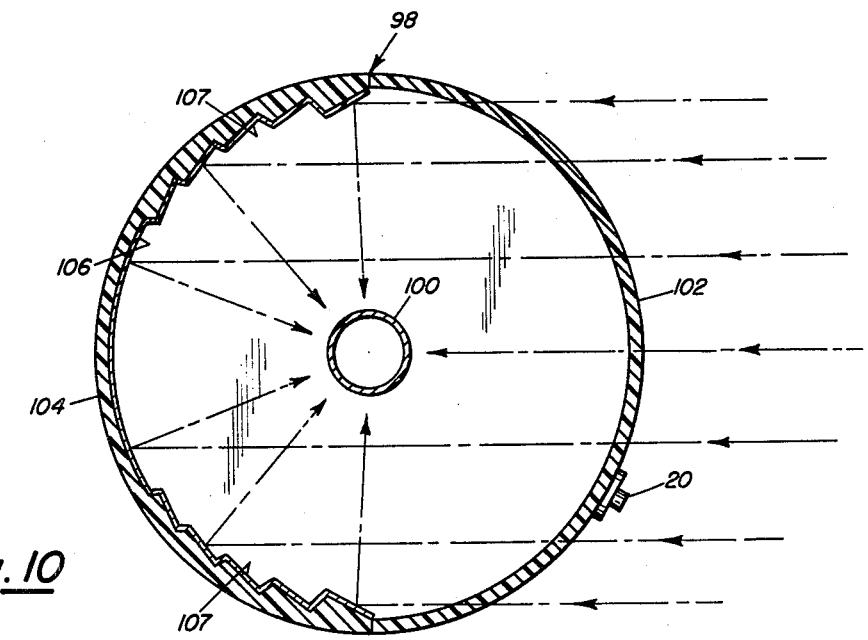
FIG. 10 is a view similar to FIG. 2, but showing the integral zoned focusing portion in the form of a mirror.
Figure 11:
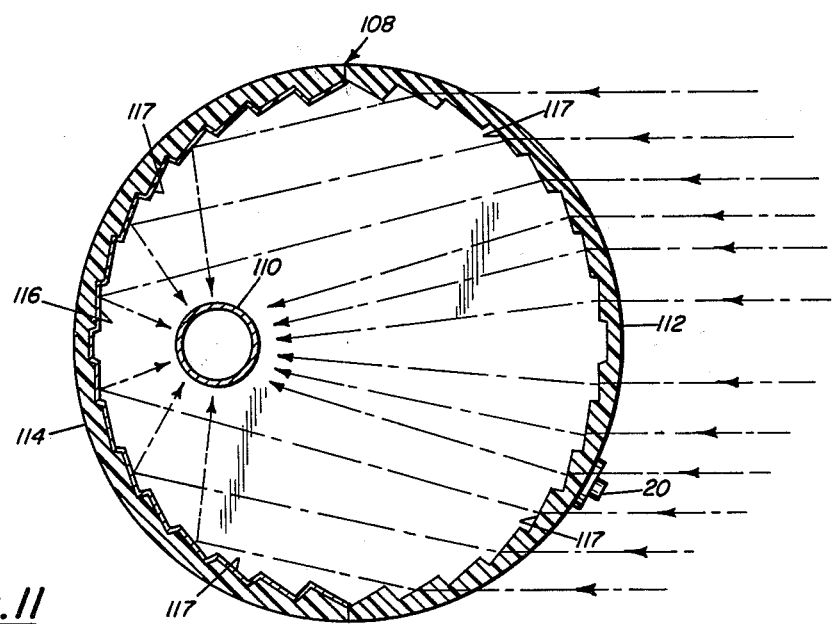
FIG. 11 is a view similar to FIG. 2, part of the wall being shown as transparent and the focusing portion being shown as a mirror.

In the embodiment shown in FIG. 11, the casing 108 may be cylindrical or spherical and is herein shown as cylindrical, the element to be heated is in the form of a pipe 110. One-half of the casing shown at 112 is in the form of a transparent fresnel lens, while the other half 114 is in the form of a fresnel mirror, it being coated with a reflecting material 116, and like, in FIG. 10, is designed, through fresnel sections 117, to focus the reflected rays onto the element 110.

While it is realized that the flexibility of the various casings decreases the optical accuracy possible in the zones lens, the loss of efficiency is minor. In fact, except in the case of the solar furnace configuration, a precise focus is not essential or even desirable, since the extremely high concentration of energy from the large area lens can produce temperatures sufficient to melt or burn most materials. Thus the effective focus of the lens is an area of concentration rather than a small spot, the area being linear or circular depending on the shape of the lens. Only a low pressure differential is needed to keep the units inflated and any distortion resulting from pressure variation is negligible.

An advantage inherent in the above described arrangement is that the heat energy is concentrated on a collector of small external area, with the result that heat losses, especially as by conduction and convection, are relatively small, and this results in permitting practical attainment of temperatures greatly in excess of temperatures obtainable in any system not having such a heat focusing system. In other words, this invention does not depend solely upon the so-called "green house" effect for its heat storage function.

It is understood that minor variation from the form of the invention disclosed herein may be made without departure from the spirit and scope of the invention, and that the specification and drawings are to be considered as merely illustrative rather than limiting.

I claim:
1. A solar energy collector comprising:
 (A) Wall means forming an inflatable casing, said wall means including:
  (1) A wall section of substantially flexible and collapsible material, said section having:
   (a) A transparent portion generally conforming to the configuration of said section and being configured to concentrate solar energy onto a restricted area;
 (B) energy receiving means mounted in fixed relation to said wall portion and within the restricted area;
 (C) and means carried by said wall means for admitting a fluid to inflate said casing.

2. A solar energy collector as defined in claim 1, characterized in that a part of said wall portion is in the form of a mirror.

3. A solar energy collector comprising:
 (A) Wall means forming an inflatable casing, said wall means including:
  (1) A wall portion of substantially flexible and collapsible material, said wall portion having:
   (a) A lens unitary therewith and generally conforming to the configuration of said wall portion, at least a portion of said lens being configured to concentrate solar energy on a restricted area;
 (B) energy receiving means mounted in fixed relation to said lens and within the restricted area;
 (C) and means carried by said wall means for admitting a fluid to inflate said casing.

4. A solar energy collector comprising: Wall means forming an inflatable casing, said wall means including a wall portion of substantially flexible and collapsible material, said wall portion having a lens unitary therewith and generally conforming to the configuration of said wall portion, said lens being configured to concentrate solar energy on a restricted area; energy receiving means mounted in fixed relation to said lens and within said restricted area; and means carried by said wall means for admitting a fluid to inflate said casing.

5. A solar energy collector comprising: Wall means forming an inflatable casing, said wall means including a wall portion of substantially flexible and collapsible material, said wall portion having a lens unitary therewith and generally conforming to the configuration of said wall portion, said lens having a plurality of generally parallel zones configured to concentrate solar energy on a restricted area; energy receiving means arranged in elongated form generally parallel to said zones and mounted in fixed relation to said lens and within said restricted area; and means carried by said wall means for admitting a fluid to inflate said casing.

6. A solar energy collector comprising: Wall means forming an inflatable casing, said wall means including a wall portion of substantially flexible and collapsible material, said wall portion having a lens unitary therewith and generally conforming to the configuration of said wall portion, said lens having a plurality of generally parallel zones configured to concentrate solar energy on a restricted area; a fluid conducting member extending through said casing and traversing said restricted area; and means carried by said wall means for admitting a gas to inflate said casing.

7. A solar energy collector comprising: Wall means forming an inflatable casing, said wall means including a wall portion of substantially flexible and collapsible material, said wall portion having a lens unitary therewith and generally conforming to the configuration of said wall portion, said lens having a plurality of generally parallel zones configured to concentrate solar energy on a restricted area; a fluid conducting member extending through said casing and traversing said restricted area; a reflector surface in fixed relation to said lens and disposed adjacent said member to reflect a portion of the solar energy from said lens onto said member; and means carried by said wall means for admitting a fluid to inflate said casing.

8. A solar energy collector comprising: Wall means forming a double-ended, elongated, generally cylindrical, and inflatable casing, said wall means including a wall portion of substantially flexible and collapsible material, said wall portion having a zoned lens of the fresnel type unitary therewith and generally conforming to the configuration of said wall portion, said lens having a plurality of parallel, longitudinally extending zones configured to concentrate solar energy on an elongated restricted area; a fluid conducting pipe arranged generally parallel to said zones, and mounted in fixed relation to said lens and within said restricted area; and means carried by said wall means for admitting a fluid to inflate said casing.

9. A solar energy collector according to claim 8 wherein said pipe transverses the length of said casing along the axis of said casing.

10. A solar energy collector comprising: Wall means forming an elongated, generally cylindrical, and inflatable casing, said wall means including a wall portion of substantially flexible and collapsible material, said wall portion having a lens unitary therewith and generally conforming to the configuration of said wall portion, said lens having a plurality of parallel, longitudinally extending zones configured to concentrate solar energy on an elongated restricted area; elongated energy receiving means mounted in fixed relation to said lens along an axis parallel to and spaced from the axis of said casing, and within said restricted area; a reflector surface fixed to said wall portion in opposed relation to said lens to direct a portion of the solar energy onto said energy receiving means, said reflector surface being supported in said opposed relation by said wall portion upon inflation of said casing; and means carried by said casing for admitting a fluid to inflate said casing.

11. A solar energy collector comprising: Wall means forming an elongated, generally cylindrical, and inflatable casing, said wall means including a plurality of transverse walls providing a plurality of chambers in said casing, said wall means further including a wall portion of substantially flexible and collapsible material, said wall portion having a lens unitary therewith and generally conforming to the configuration of said wall portion, said lens having a plurality of generally parallel, longitudinally extending zones configured to concentrate solar energy on an elongated restricted area; energy receiving means arranged in elongated form generally parallel to said zones and mounted in fixed relation to said lens and within said restricted area, and extending longitudinally through said casing and said plurality of transverse walls; and means carried by said wall means adjacent each said chamber for admitting a fluid to independently inflate each said chamber.

12. A solar energy collector comprising: Wall means forming an elongated, generally cylindrical, and inflatable casing, said wall means including a plurality of transverse walls providing a plurality of chambers in said casing, said wall means further including a wall portion of substantially flexible and collapsible material, said wall portion having a lens unitary therewith and generally conforming to the configuration of said wall portion, said lens having a plurality of generally parallel, longitudinally extending zones configured to concentrate solar energy on an elongated restricted area; energy receiving means arranged in elongated form generally parallel to said zones and mounted in fixed relation to said lens and within said restricted area, said energy receiving means extending longitudinally through said plurality of transverse walls, and supported by said plurality of transverse walls upon inflation of said casing; and means carried by said wall means adjacent each said chamber for admitting a gas to independently inflate each said chamber.

13. A solar energy collector comprising: An inflatable casing of substantially flexible material having a lens unitary with a portion of said casing and conforming to the configuration of said portion, said lens being configured to concentrate solar energy on a restricted area; energy receiving means mounted in fixed relation to said lens and within said restricted area; and means carried by said casing for admitting a fluid to inflate said casing.

14. A solar energy collector comprising: Wall means forming an inflatable casing, said wall means including a wall portion of substantially flexible material, said wall portion including a lens unitary therewith and supported by said wall portion upon inflation of said casing, said lens being configured to concentrate solar energy on a restricted area; energy receiving means mounted in fixed relation to said lens and within said restricted area; and means carried by said casing for admitting a fluid to inflate said casing.

15. A solar energy collector comprising:
(A) Wall means forming an inflatable casing, said wall means including:
  (1) A wall section of substantially flexible and collapsible material, said section having:
    (a) a mirror portion generally conforming with the configuration of said section and being configured to concentrate solar energy onto a restricted area;
    (b) a transparent portion in the form of a fresnel lens disposed to focus, in conjunction with the mirror, concentrated solar energy onto said restricted area;
(B) energy receiving means mounted in fixed relation to said wall portions, and within the restricted area;
(C) and means carried by said wall means for admitting a fluid to inflate said casing.

16. A solar energy collector as defined in claim 15, characterized in that the mirror is of the fresnel type.

17. A solar energy collector comprising:
(A) A wall section of substantially flexible and collapsible material, said section having:
  (a) a portion in the form of a fresnel mirror generally conforming with the configuration of said section and being configured to concentrate solar energy onto a restricted area;
  (b) a lens portion disposed to focus, in conjunction with the fresnel mirror, concentrated solar energy onto said restricted area;
(B) energy receiving means mounted in fixed relation to said wall portions, and within the restricted area;
(C) and means carried by said wall means for admitting a fluid to inflate said casing.

References Cited in the file of this patent

UNITED STATES PATENTS

| | | |
|---|---|---|
| 2,427,262 | Delano | Sept. 9, 1947 |
| 2,455,834 | Ushakoff | Dec. 7, 1948 |
| 2,798,478 | Tarcici | July 9, 1957 |
| 2,872,915 | Bowen | Feb. 10, 1959 |
| 2,920,710 | Howard | Jan. 12, 1960 |
| 3,054,328 | Rodgers | Sept. 18, 1962 |

FOREIGN PATENTS

| | | |
|---|---|---|
| 131,069 | Australia | Jan. 21, 1949 |